United States Patent [19]

Aube et al.

[11] Patent Number: 5,338,329

[45] Date of Patent: Aug. 16, 1994

[54] PROCESS AND DEVICE FOR OBTAINING MINERAL FIBERS

[75] Inventors: Jean-Yves Aube, Clermont; Emmanuel Giry, Liancourt, both of France

[73] Assignee: Isover Saint-Gobain, Courbevoie, France

[21] Appl. No.: 822,199

[22] Filed: Jan. 17, 1992

[30] Foreign Application Priority Data

Jan. 18, 1991 [FR] France ............................. 91 00547
Jan. 18, 1991 [FR] France ............................. 91 00548

[51] Int. Cl.$^5$ .................................................. C03B 37/04
[52] U.S. Cl. ............................................ 65/521; 65/19; 65/509; 373/28; 373/33; 373/34; 373/80
[58] Field of Search ................. 373/27, 80, 28, 29, 373/30, 31, 32, 33, 35, 36, 38; 65/8, 15, 19, 12, 374.15, DIG. 4

[56] References Cited

U.S. PATENT DOCUMENTS

| | | |
|---|---|---|
| 3,390,219 | 6/1968 | Henriksen et al. . |
| 4,146,375 | 3/1978 | MacPhearson et al. ........ 65/DIG. 4 |
| 4,650,510 | 3/1987 | Tuovinen ........................ 65/8 |
| 4,664,691 | 5/1987 | Debouzie et al. ............... 65/6 |
| 4,679,205 | 7/1987 | Heidenrich et al. . |
| 4,969,940 | 11/1990 | Schwarb et al. ................ 65/8 |
| 5,123,941 | 6/1992 | Laurén et al. ................. 65/15 |

FOREIGN PATENT DOCUMENTS

| | | |
|---|---|---|
| 0128965 | 12/1984 | European Pat. Off. . |
| 1069730 | 11/1952 | France . |
| 2535835 | 11/1984 | France . |
| 63-176313 | 1/1987 | Japan . |

*Primary Examiner*—Robert L. Lindsay
*Attorney, Agent, or Firm*—Oblon, Spivak, McClelland, Maier & Neustadt

[57] ABSTRACT

For obtaining mineral fibers from a thermoplastic material having a high melting point, and more precisely for the regulation of the flow rate and temperature of the stream of molten material distributed on the fiber-drawing machine, the molten material is conveyed via a reservoir where the flow rate is regulated and the height of the molten material at the base of the tapping aperture is controlled by inclining the reservoir. Preferably the molten material is subject to a basic heating process which raises its temperature close to the fiber-drawing temperature and, in the vicinity of the tapping aperture, it is subject to additional heating in order to adjust the temperature precisely.

16 Claims, 3 Drawing Sheets

FIG_1

PROCESS AND DEVICE FOR OBTAINING MINERAL FIBERS

BACKGROUND OF THE INVENTION

1. Field of the Invention

The invention relates to techniques for obtaining mineral fibers produced from a material having a high melting point such an basalt glass, glass based on blast furnace slag or any other similar glass composition. More precisely, the invention relates to the problem of conveying the material in the molten state from its melting chamber to a so-called free centrifuging fiber-drawing machine, i.e. a machine comprising one or more centrifuging wheels rotated at a high speed and onto the periphery of which there is poured the material to be drawn which is entrained by these wheels before some of the material is conveyed to the following wheel and the remainder is transformed into fibers under the effect of centrifugal force. The fibers are immediately entrained to a reception device by means of gaseous currents emitted perpendicular to the direction in which the fibers form.

2. Description of the Related Art

The techniques briefly mentioned above are used in order to produce so called rock wool which is used specially for manufacturing insulating products. They have the great advantage of enabling glasses with a high melting point to be processed, thus leading to products which are highly fireproof and with production and raw material costs which are relatively low, at least in comparison with those used in other fiber-drawing techniques. However, this moderate cost is to a large extent due to a certain simplicity of the technique, in particular as regards the conditioning of the glass.

In effect it is well known that fiber-drawing installations - in particular as regards the fiber yield and the quality of the fibers produced - are assessed more favorably, the more the fiber-drawing machine is supplied with a perfectly conditioned glass. What is understood by "conditioning" conforms to the reference value from the point of view of its composition, its temperature and its flow rate without any large irregularities being noted with respect to these features. Conventional glass-making ovens cannot ensure that this conditioning will be satisfactory since the refractories are rapidly corroded by the glasses used in this type of technique unless they accept temperatures of less than 1450° C. at the furnace outlet while the optimum conditions for drawing fibers are at temperatures in the vicinity of 1600° C. or even slightly more. In fact, in the fiber-drawing techniques examined here, the glass is usually melted in a chamber of the cupola type furnace in accordance with a method similar to that practiced in foundries, except for those differences due to the differing materials. The cupola furnace is a furnace which can produce particularly high flow rates for molten materials with a relatively cost-favorable fuel, e.g., coke, and very low maintenance costs. The cupola furnace is charged at the top alternately with layers of the material to be melted and layers of coke or directly with mixtures of coke and the material to be melted. The combustion of the coke, by means of air or pure oxygen blown into the lower part of the cupola, ensures that the heat required for the glass to melt is released. The molten mixture escapes continuously via a tapping hole located in the vicinity of this lower section. When operation has become established, the effect of a regular supply of alternating charges is in principle the formation of a stack of strata having a fixed thickness and level, the coke combustion and glass melting zone replacing this stack in the area of the nozzles.

Owing to the close proximity of the fusion zone and the nozzles which blow in the oxidizing agent, there is intense turbulence at the tapping hole which is due in particular to the permanent competition between the molten material and the combustion gases which are both attempting to escape. Owing to this fact, the flow is highly spasmodic. On the other hand, a cupola furnace is never as stable as one would wish it to be, and it can happen, for example, that a layer of coke flows violently instead of being gradually consumed with the consequence that blocks of unmelted coke are present in the molten material flow; apart from the great change in the flow rate of the molten material resulting therefrom, this discharge of coke is very harmful to the useful life of the centrifuging wheels which are generally made from refractory steel. In addition, instability of this type in the cupola furnace may lead to variations in temperature and, as a direct result, in the viscosity of the molten material and thus in its behavior during the fiber-drawing process.

In addition to these irregularities in the flow rate and temperature, there are irregularities in the composition of the molten material, if only from the point of view of the content of ferrous and ferric oxides, as the reduction of ferrous oxides to metallic iron is never complete and varies according to the more or less reducing nature of the atmosphere in the cupola furnace atmosphere; on the other hand, even if the melt produced by this reduction of the iron oxides is more dense than the molten glass and accumulates at the base of the cupola furnace, it is not rare to see it escape, although in small proportions it is true, with the flow of molten glass, giving rise to the considerable risk of damage to the centrifuging wheels.

In order to overcome these problems, it is known from French patent FR-B-2 572 390 to position in the path of the molten material a fore-hearth forming a reservoir having a free surface sufficient to at least partially attenuate variations in the flow rate at the outlet of this reservoir. The volume of this reservoir is preferably small and corresponds for example to an operating period of between 30 seconds and 3 minutes.

This small size is desirable in particular in order to restrict the cooling of the molten material held therein and the formation of dead areas, i.e. areas in which the material is in the devitrified state and no longer in the molten state, the fraction of the volume of the reservoir occupied by dead zones of this type being in fact unusable. Nevertheless, it is evident that the smaller the volume of the reservoir, the lesser the homogenization effect of the flow rate and possibly of the glass composition will be, and thus the more difficult it will be to control with any degree of accuracy the key parameters of the fiber-drawing process, i.e., the flow rate, temperature and composition of the molten glass.

In addition, even though the intensity of cooling is restricted, heat losses are no less real, the lowering of the temperature in the reservoir being of the order of 50° to 100° C. for example, which means that the material must be superheated to the same extent in the cupola furnace. Owing to its size and the very principle which controls its operation, the cupola furnace is a type of furnace which does not easily lend itself to extensive regulation of the temperature.

Moreover the fundamental difficulty with a reservoir of this type formed of a free surface with a flow via an overflow is that, by definition, it does not enable the flow rate to be controlled but only the variations thereof to be restricted. The average flow rate is thus imposed by the cupola furnace and cannot be modified with the degree of flexibility and speed desired in order to take account of the actual operating conditions of the fiber-drawing machine and in particular the position and distribution of the molten material stream on the first of the centrifuging wheels.

Patent application WO 90 02711 proposes operating such that material is melted in two stages, a melting stage in the cupola furnace and a superheating phase in the reservoir by means of a plasma heating device. The temperature of the molten material in the cupola furnace is therefore increased by the order of 20° to 150° C. relative to its outlet temperature. A system of this type enables the temperature of the molten glass conveyed over the first centrifuging wheel to be controlled efficiently but at the cost of a relatively complex heating installation which conflicts somewhat with the other, simpler components; the juxtaposition of components having very different technological values preferably being avoided on a production site. Moreover, the technique of heating by plasma can only operate efficiently on small amounts of molten glass, thus with a reservoir having a relatively small volume.

Apart from the disadvantages already cited above in this respect, it should be noted that in practice this also prevents the composition of the molten glass being altered in the reservoir. The possibility of adjustments of this type enables the cupola furnace to be supplied with a standard composition which in always the same while the final composition is adapted to the manufactured product or conversely any undesirable differences in the compositions of the raw materials to be corrected rapidly.

Furthermore, the fact should still be borne in mind that the basic problem of melting in a cupola furnace is that of the irregularity of the flow rates and this problem is only resolved to an unsatisfactory degree in the aforementioned PCT and French publications. In patent application WO-90 02711, the molten glass does not flow via an overflow but via a tapping hole located in the base of the reservoir protected by an immersed barrier which prevents the flow of the melt which, being more dense, is decanted at the base of the reservoir. The flow of molten material depends entirely on the height of the molten glass above the tapping hole, which height depends firstly on the flow rate of the supply to the reservoir and secondly on the dimensions of the reservoir or more exactly on the dimensions of its free surface area. The occupied section of a relatively small reservoir, of a size such that it can be heated using plasma, thus restricts the flow rate regulating capacities.

The same is true when the flow of glass is via a tapping hole at the base of the reservoir, with, moreover, additional difficulties connected with the wear of the tapping nozzles and thus the necessity to replace them, in particular owing to the highly corrosive nature of basalt glasses and the very high temperatures (far above 1000° C.), and also connected with the great tendency of these glasses to devitrify at temperatures scarcely below the temperatures suitable for fiber-drawing, i.e. at which the viscosity of the glass is well adapted to a fiber-drawing process. Even if the nozzle is not cooled, there is a tendency for a crust of devitrified material to form on the nozzle on contact with the colder ambient air, this crust growing to a greater or lesser extent and reducing the passage cross-section of the glass; although this phenomenon may be overcome to a certain extent, it greatly complicates any attempt to regulate the flow rate by permanently altering the opening cross-section of the tapping aperture.

This devitrification phenomenon is particularly critical In the phases when the fiber-drawing machine is started up again since a plug forms which totally blocks the tapping aperture when the cupola furnace in tapped again. This plug must be removed by heating, for example by means of a blowpipe, until the flow is sufficiently great to provide the energy for maintaining the tapping process as a result of the developing crust being permanently leached. This heating stage using a blowpipe involves the risk of damaging the pouring nozzle as a result of overheating.

Furthermore, even in so-called continuous operation, the flow of molten material from the cupola furnace is regularly interrupted, in particular in order to tap off the molten iron accumulated at the base of the cupola furnace, which operation therefore interrupts the production of fibers at a moment which may be inconvenient. It is evident that this stoppage can only be avoided if the volume of the reservoir is relatively large and corresponds for example to a production period of the order of 5 to 10 minutes, the average time required for tapping off the molten iron.

SUMMARY OF THE INVENTION

The invention has an object to improve the techniques for obtaining fibers from a thermoplastic material having a high melting point, in particular of the basalt glass type or the like, enabling the problem of distribution of this material to the fiber-drawing machine to be controlled to a greater degree and in particular improving the control of the flow rate.

Another object of the invention is a process for obtaining fibers from a thermoplastic material having a high melting point consisting in melting the said material and distributing it in the molten state, in the form of a stream, onto a fiber-drawing machine, the molten material on its path towards the fiber-drawing machine forming a reservoir from which the molten material flows via a tapping aperture and the inclination of which can be adjusted in order to control the height of the molten material at the base of the tapping aperture.

In accordance with the invention, the flow rate is thus regulated by regulating the pressure at the tapping aperture, which regulation enables both the differences in the flow rates which are due to the pulsating-like operation of the cupola furnace and above all the greater variations which are in particular due to the interruption of the supply in order to extract the melt which accumulates at the base of the cupola furnace to be compensated for. It is also possible to alter this inclination in order to charge the pouring nozzle abruptly when an installation is started up, the reserve then being firstly filled by leaving the nozzle uncovered before being rapidly tilted such that the level of glass above the tapping aperture changes almost instantly from a zero level to the operating level, which greatly facilitates the start of the pouring process.

Conversely, the nozzle can be uncovered without interrupting the supply via the cupola furnace, which enables it to be replaced in operation.

It is evident that this second point is only possible insofar as the volume of the reservoir is sufficient to supply the fiber-drawing machine during the entire stoppage period and above all if a relatively large free surface area is finely regulated. It is thus advantageous to provide a volume corresponding at least to 8 minutes and preferably to more than 10 minutes production of the fiber-drawing machine.

The invention therefore requires a large reservoir in which the basic heating process of the molten glass is preferably performed while compensating for the cooling effect when the glass has been held in this reservoir and preferably completing the heating of the molten material in order to raise the temperature thereof close to the fiber-drawing temperature. In order to ensure that the heating means operates efficiently, the reservoir is advantageously inclined about a center or axis of rotation located such that the glass level is unchanged - or almost unchanged. In this case, burners, in particular oxyacetylene burners, can be used which are at a constant distance from the surface of the molten glass; so-called dipped electrodes can also be used which are thus secured at the top, the depth of the electrodes washed by the glass remaining constant such that the electrical conditions are not modified when the inclination of the reservoir is altered.

This inclination with a constant glass level is all the more simple to bring about, the more eccentric the tapping aperture. It is for this reason that the molten glass is preferably tapped from a pouring nozzle at an extended piece of the reservoir, of which the volume is at most of the order of one tenth, and preferably one twentieth, the total volume of the reservoir such that the differences in height resulting from the inclination are amplified, and of which the low level is preferably raised relative to the remainder of the reservoir in order to avoid all risk of entraining the residual melt with the flow of material distributed to the fiber-drawing machine.

In one variant of the invention which in especially preferred, the molten material is additionally heated at this lengthening piece in order to control the temperature of the thin stream of glass very precisely in the vicinity of the tapping aperture. This additional heating process is preferably performed by electrical means. Combined with the basic heating process, this enables the glass to be conditioned very precisely despite of the fact that it is almost impossible to perform this process in a melting chamber conventional for this type of technique.

This preferred variant of the invention takes as it starting point the importance of highly accurate thermal conditioning of the molten material and the near impossibility of performing the latter in a melting chamber conventional for this type of technique, i.e., in a cupola furnace. However, the present inventors consider that this prime requirement is augmented by the requirement for a given amount of agitation of the molten material and a retention time which is sufficiently long to enable this agitation to occur and, during this agitation, the elimination of undesirable components which are essentially cast iron and unburnt blocks of coke. These numerous requirements are fulfilled by dividing the supply of heat into three sections which, although they are unequal from the quantitative point of view, are nevertheless all three decisive for attaining high-quality fibers. By way of example, the melting process in the cupola furnace may raise the molten material to a temperature of the order of 1450° C. For a fiber-drawing temperature of 1600° C., there is a need to increase the temperature in the reservoir by the order of 150° C. and regulate it to within ±5° C. by means of an additional heating device.

It is thus possible to divide the heat supply into three sections which, although unequal as regards quantity, are nonetheless all three decisive for obtaining high-quality fibers. In general, the increase in temperature in the reservoir is between 50° and 250° C., which, rather than requiring a cupola furnace, enables a more conventional glass-making furnace to be used, which normally cannot be used since the refractories employed in the construction of these glass-making furnaces are incompatible with molten basalt glass at more than 1450° C.

As already mentioned the additional heating in the vicinity of the tapping aperture is preferably performed electrically by devices with low inertia in order to achieve fine and rapid regulation; a set of two electrodes supplied with two-phase current can be used for example.

For the basic heating process, oxyacetylene burners can be used—in this case the two electrodes near the tapping aperture are mounted such that they are immersed in order to preserve the non-oxidizing atmosphere generated by the burners. This basic heating may likewise be performed by electrical-means, for example using a set of three electrodes supplied with three-phase current, a controlled non-oxidizing atmosphere being produced above the bath if an assembly of the immersed electrode type is selected.

The process according to the invention is all the more efficient if the additional heating process solely concerns a small volume of material to be melted, which may advantageously be achieved by arranging the height of the molten material to be lower at the base of the tapping aperture, the base of this section of the reservoir being located at a higher level, for example at the midway point if the measurement is taken from the lowest point of the reservoir, such that the heavier melt is decanted into the deeper zones and cannot escape with the flow of material poured onto the fiber-drawing machine. Tapping is thus performed by a lengthening piece of which the volume is preferably at most ten times the total volume of the reservoir and of which the base is raised.

The invention likewise relates to a device for obtaining mineral fibers, comprising a melting chamber, a reservoir comprising a melting pot provided with basic heating means, and a tapping aperture distributing the molten material flow towards a fiber-drawing machine, and means enabling the inclination of the reservoir to be varied, such as suspension post having variable lengths and consisting of screw jacks mounted on pivot pins, for example.

Preferably the reservoir comprises a pouring spout of which the volume is small in comparison with the total volume of the reservoir and preferably does not exceed one tenth thereof, this spout having a raised lower level and preferably being provided with additional heating means.

Heating is preferably achieved by dipped electrodes so as to prevent any problems with sealing, the electrodes being made from a material which is compatible with glass and in particular with the presence of a given amount of iron in the melt. Graphite electrodes may be used for example. A non-oxidizing atmosphere is created above the molten glass bath so as to restrict problems of the dipped part of the electrodes oxidizing.

In order to control totally the flow rate of molten material, the reservoir is preferably secured to suspension posts of variable length, which enables the inclination of the reservoir, and thus the height of the molten material at the base of the tapping aperture, to be adjusted.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings wherein.

DETAILED DESCRIPTION OF THE PREFERRED EMBODIMENTS

Figure 1:
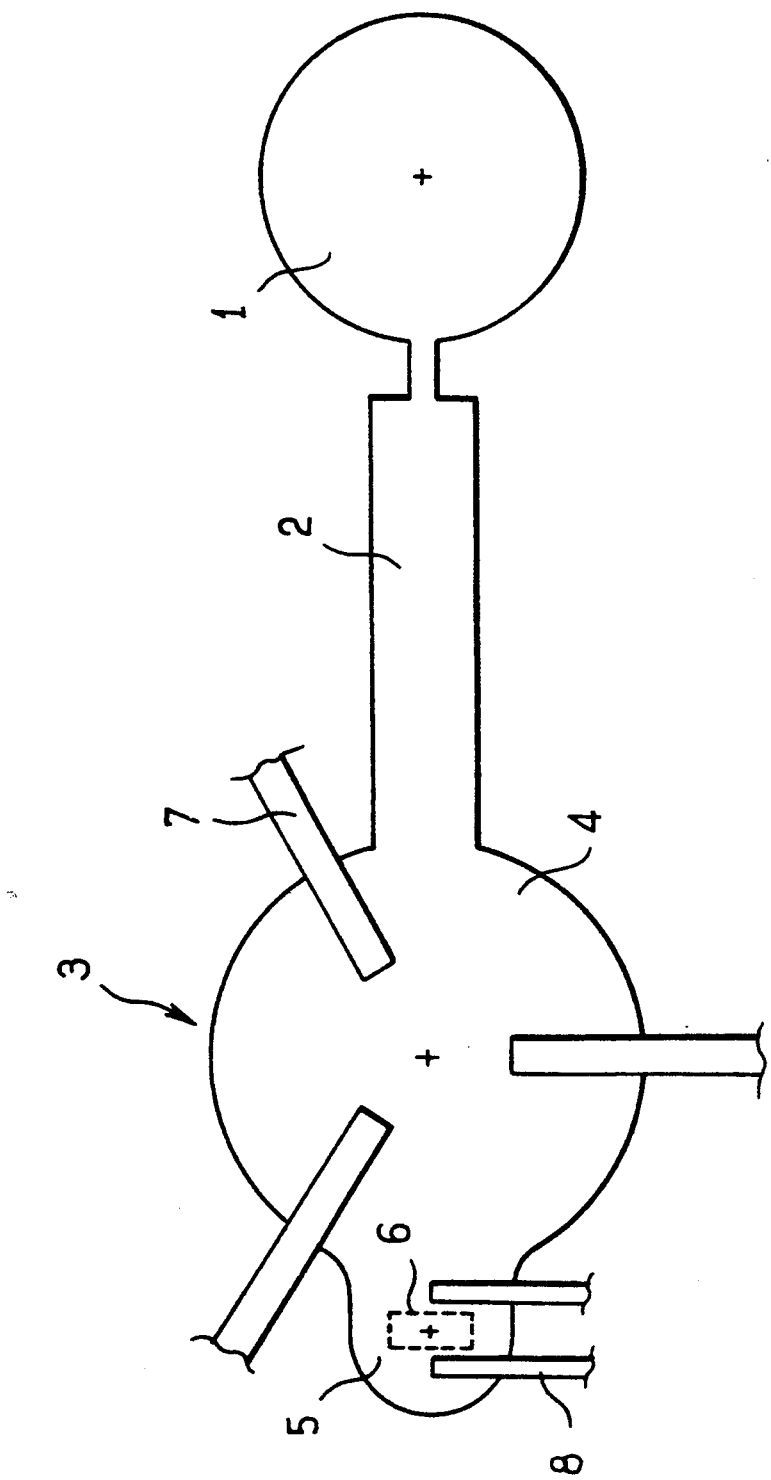
FIG. 1 is a schematic plan view of a device for obtaining mineral fibers in accordance with the invention.

FIG. 1 illustrates the principle of the invention. The material is melted in a cylindrical melting chamber of the cupola type furnace 1. At the outlet of the cupola furnace 1 it is conveyed by a chute 2 into a reservoir 3 formed by a cylindrical melting pot 4 and a pouring spout 5 disposed vertically above the first centrifuging wheel 6 of the fiber-drawing machine. It should be noted that it is also possible, or even desirable in order to restrict heat losses, to operate with a reservoir fed directly by the cupola furnace. More precisely, the fiber-drawing machine comprises three or four wheels moved rapidly in rotation, two wheels rotating successively in opposite directions. A stream 17 of molten material is poured onto the peripheral strip of the first wheel, is accelerated there such that the material is conveyed onto the peripheral strip of the following wheel from which it is detached so as to be partly transformed into fibers under the effect of the centrifugal force and partly to be conveyed to the following wheel. The fibers are separated from the material which is not drawn into fibers by means of gaseous currents which are emitted tangentially relative to the peripheral strips and which entrain them towards a receiving unit. Further details regarding this type of fiber-drawing machine can be found in particular in European patents EP-B-59 152 and EP-B-195 725 and in the European patent application EP-A 439 385.

Numerous studies have demonstrated that, all things being equal, the quality of fiber-drawing achieved by a so-called free centrifuging machine depends strictly on the temperature of the thin glass stream poured onto the first centrifuging wheel.

Thus with a given basalt composition on a given machine and in given operating conditions, it has been possible to measure a fasonaire, i.e., a specific measure related to a permeability coefficient of 210, 235 or 290 millimeters of head of water respectively for glasses at 1410°, 1435° and 1500° C. It should be remembered that the permeability coefficient is a value of resistance to penetration in a 5 g compressed sample of fiber measured in perfectly standardized conditions. This permeability coefficient is correlated with the fineness of the fibers or the insulating power. A mineral fiber product being determined as being of a better quality, the greater its permeability coefficient.

In addition, a high and constant temperature is relatively difficult to obtain directly from a cupola furnace. On the other hand, irregularities in the flow rate and composition of the molten material are very frequently observed and also have a very great influence on the quality of the product. The problem of controlling both the flow rate and the temperature is resolved here by combining a melting pot 4, provided with three dipped electrodes 7, and a relatively large volume, suitable for ensuring that the fiber-drawing machine operates for 8 to 10 minutes for example, when the reservoir is no longer supplied, and a pouring spout 5 which is itself provided with two electrodes 8.

Figure 2:
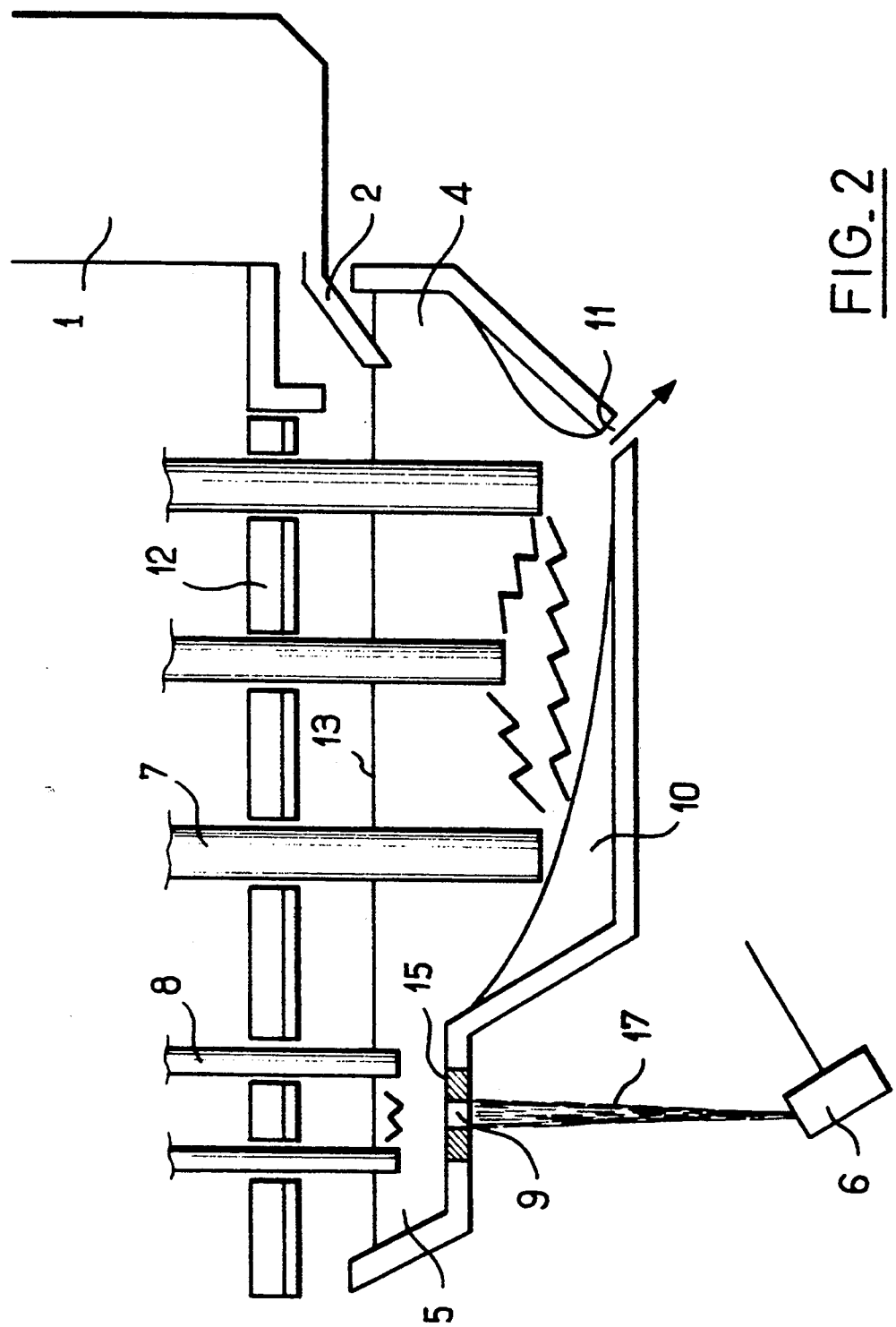
FIG. 2 is a side view corresponding to FIG. 1.
Figure 3:
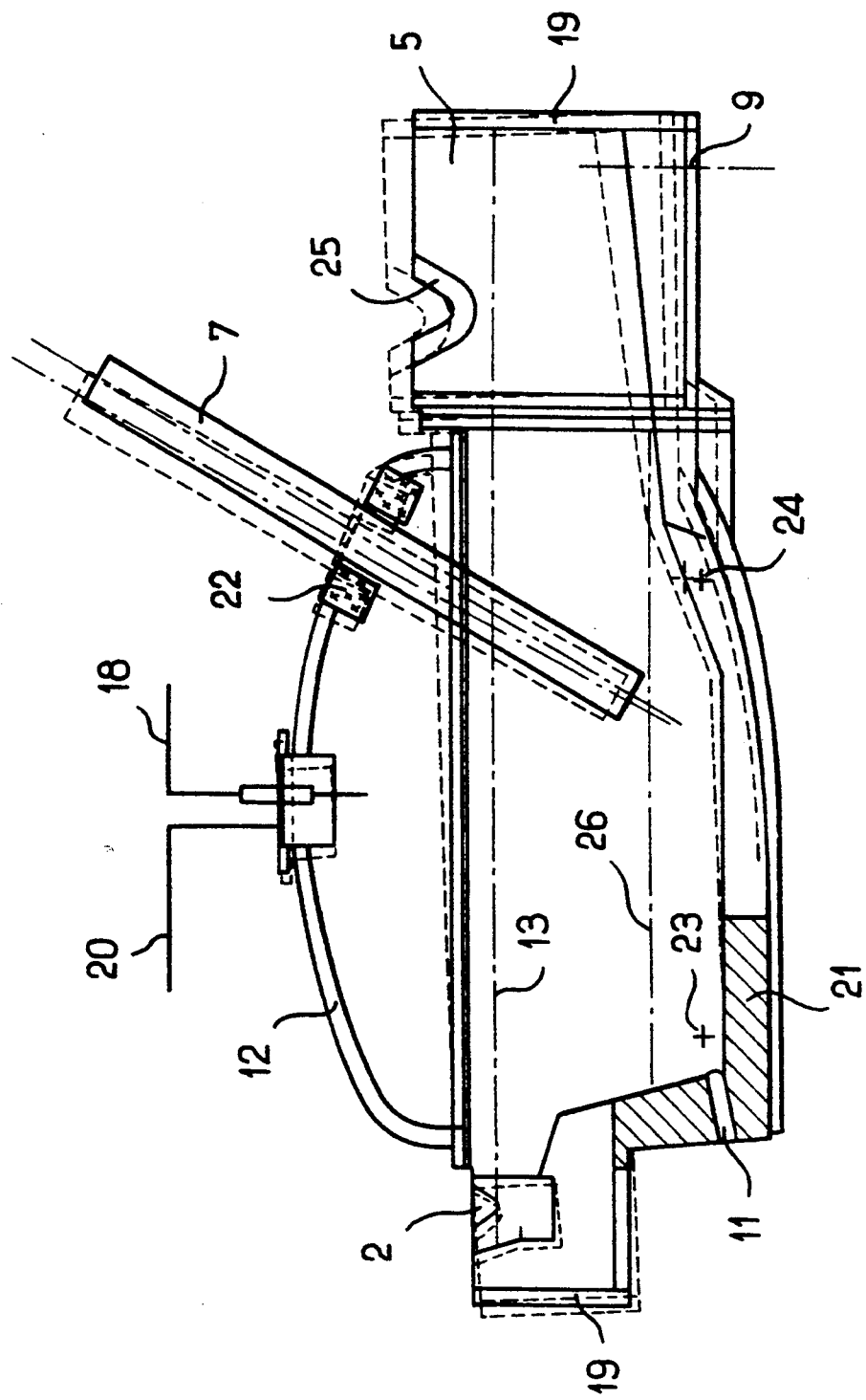
FIG. 3 is a more detailed side view illustrating the method of controlling the flow rate proposed according to one of the variants of the invention.

It can he seen in particular from FIGS. 2 and 3, the pouring spout 5 is of small volume relative to that of the melting pot, for example it is of the order of one-twentieth thereof. Under these conditions, the two electrodes 8 enable the temperature of the molten material to be adjusted very precisely and rapidly. These two electrodes 8 are preferably supplied with a two-phase current while the electrodes 7 of the melting pot are supplied with three-phase current for reasons of equilibrium.

In order to overcome any sealing problems, it is preferable to operate with dipped electrodes made from graphite, molybdenum, which is the material currently used for glass- furnace electrodes, not being suitable in this case owing to the presence of metallic iron in the composition. A non-oxidizing atmosphere should be maintained above the molten material bath in order to avoid rapid wear of these electrodes. To this end, the reservoir in provided with a cover 12 which further restricts heat losses, and natural gas is injected via duct 18 into the cavity delimited in this manner. The electrodes 7 pass through the cover 12 via graphite parts 22 and are secured on fixed supports which are not illustrated here. It should be noted that the chute 2 is likewise capped, which has the double effect of preventing splashes of molten material and reducing the cooling of the glass as it passes from the cupola furnace to the reservoir, which path may be long in certain circumstances (up to approximately 10 meters) since the tapping aperture 9 is preferably exactly vertical with respect to the first wheel 6 and it is not always possible, or even desirable, to dispose the cupola furnace too close to the fiber-drawing machine.

It should be noted that the use of electrodes provides further means for alerting the operator if there is a need to drain the melt. When the level of cast iron increases and is close to the limit level illustrated at 26 in FIG. 3, the electrical current passing through the mass of molten glass decreases greatly, as iron is far more conductive than glass.

The chute 2, melting pot 4 and pouring spout 5 are preferably formed by double walls 19 of refractory steel cooled by intense circulation of water from duct 20, such that a protective layer 10 of devitrified glass is formed. The base 21 of the melting pot 4 in which the cast iron discharged from the cupola furnace 1 accumulates is itself made from refractories, for example of the type lined with carbon. It is provided with an opening 11 which may of course be blocked and through which the cast iron can be drained. The pouring spout is made in a similar manner and is mounted so as to be detachable from the assembly in order to minimize problems when replacing the pouring nozzle.

The flow rate of the feed 17 to the fiber-drawing machine is preferably controlled by combining a number of means. The first is evidently due to the plugging effect of a large volume such that fluctuations of molten material level 13 are largely attenuated. The tapping aperture 9 comprises a nozzle 15, preferably made of graphite, a reducing or inert gas being blown in the direction of the nozzle in order to prevent it from oxidizing.

A second feature of the invention, which will be explained with reference to FIG. 3 in particular, consists in being able to vary the inclination of the reservoir. For this purpose the reservoir is suspended, for example, from screw jacks articulated to the reservoir via pivot pins; the two rear suspension posts opposite the pouring spout may, if necessary, be mounted such that they are fixed. These suspension posts define axes indicated by the crosses 23 and 24. By varying the length of the suspension posts connected at 24, the reservoir is articulated about the axis 23. As this axis 23 is highly eccentric, a slight angular difference is manifested by a relatively large variation in the height of the molten glass above the tapping aperture 9, which alters the flow rate. On the other hand, it is noted that the level 13 of the glass in the main part of the melting pot 4 is practically not modified while the pouring spout 5 and thus the tapping aperture 9 are themselves displaced by a relatively great distance, as may be seen by examining the position shown schematically by dashed lines. In these conditions—and insofar as the dipped electrodes are mounted fixed and not integral with the movements of the melting pot—the depth of glass washing the electrodes likewise remains constant, which prevents them from wearing rapidly. By altering the inclination of the reservoir, it is in particular possible to operate at a constant flow rate, thus with a constant glass height above the tapping aperture, even if the reservoir is no longer supplied via the chute 2.

It is also possible to alter this inclination in order to rapidly charge the pouring nozzle when an installation is started up, the reservoir then firstly being filled by leaving the nozzle uncovered before being tilted rapidly such that the level of glass above the tapping aperture changes almost instantly from a zero level to the operating level, which greatly facilitates the starting up of the pouring process.

Conversely, the nozzle may be uncovered without interrupting the flow from the cupola furnace, which enables it to be replaced in operation.

Advantageously the screw jacks disposed at each side of the reservoir are mounted independently and largely oversized so as to be able to tip the reservoir from the side and drain it via the overflow 25 if necessary.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. Device for obtaining mineral fibers, comprising:
   a melting chamber;
   a reservoir having a tapping aperture at one end thereof and containing a melted mineral material, said reservoir being melting chamber and for delivering a stream of the molten material to a fiber drawing device via the tapping aperture;
   heating means in said reservoir;
   means for tilting the reservoir about a horizontal axis adjacent an end of said reservoir opposite said one end so as to control a rate of flow of the molten material from the tapping aperture without substantially changing a level of the molten material in the reservoir; and
   a fiber drawing device positioned to receive a stream of molten mineral material from said tapping aperture.

2. The device according to claim 1, wherein said tilting means comprises variable length suspension posts supporting said reservoir.

3. The device according to claim 2, wherein said variable length suspension posts comprise screw jacks.

4. The device according to claim 1, wherein said tapping aperture comprises a graphite nozzle.

5. The device according to claim 1, wherein said reservoir is provided with a pouring spout, said tapping nozzle being positioned at a base of said spout.

6. The device according to claim 5, wherein the base of said spout is raised relative to a base of said reservoir.

7. The device according to claim 5, wherein said pouring spout is detachably mounted to said reservoir.

8. The device according to claim 5, wherein a volume of said pouring spout is between one tenth and one twentieth of a volume of said reservoir.

9. The device according to claim 1, wherein the reservoir comprises a cylindrical body having water cooled, double sided steel walls and a carbon lined base.

10. The device according to claim 5, including additional heating means in said pouring spout.

11. The device according to claim 10, wherein said additional heating means comprises a set of two electrodes supplied with two-phase current.

12. The device according to claim 10, wherein said heating means comprise a set of three dipped electrodes supplied with three-phase current.

13. The device according to claim 12, wherein the reservoir has a fixed cover through which the electrodes pass.

14. The device according to claim 13, wherein said cover has a reducing or inert gas inlet.

15. The device according to claim 11, wherein the electrodes are made of graphite.

16. The device according to claim 12, wherein said electrodes are made of graphite.

* * * * *